United States Patent
Gong et al.

(10) Patent No.: US 12,256,737 B2
(45) Date of Patent: Mar. 25, 2025

(54) PREPARATION METHOD AND APPLICATION OF WATER-SOLUBLE CHLORHEXIDINE HYALURONATE ANTIBACTERIAL AGENTS

(71) Applicants: Jiangnan University, Wuxi (CN); Shandong AMHWA BIOPHARM CO., LTD., Binzhou (CN)

(72) Inventors: Kai Gong, Wuxi (CN); Xiuyun Han, Binzhou (CN); Haoran Li, Wuxi (CN); Ying Dong, Wuxi (CN); Huimin Zhang, Wuxi (CN); Huiru Feng, Wuxi (CN); Yanqin Liu, Wuxi (CN); Xiangxiang Yu, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 18/662,301

(22) Filed: May 13, 2024

(65) Prior Publication Data
US 2024/0292841 A1  Sep. 5, 2024

Related U.S. Application Data

(63) Continuation of application No. PCT/CN2023/079839, filed on Mar. 6, 2023.

(30) Foreign Application Priority Data

Jan. 6, 2022 (CN) .......................... 202210008312.1

(51) Int. Cl.
*A01N 47/44* (2006.01)
*A01N 25/02* (2006.01)

(52) U.S. Cl.
CPC ............. *A01N 47/44* (2013.01); *A01N 25/02* (2013.01)

(58) Field of Classification Search
None
See application file for complete search history.

(56) References Cited

U.S. PATENT DOCUMENTS

2002/0018814 A1  2/2002  Werle et al.

FOREIGN PATENT DOCUMENTS

| CN | 107668062 A | 2/2018 |
|---|---|---|
| CN | 114391550 A | 4/2022 |
| JP | H115744 A | 1/1999 |
| JP | 2017048126 A | 3/2017 |
| WO | 2019135136 A1 | 7/2019 |

OTHER PUBLICATIONS

Abstract of CN 112999345 (Jun. 22, 2021).*
Abstract of CN 106265436 (Jan. 4, 2017).*

* cited by examiner

*Primary Examiner* — John Pak
(74) *Attorney, Agent, or Firm* — IPRO, PLLC; Na Xu (57) ABSTRACT

Disclosed are a water-soluble chlorhexidine antimicrobial agent and a preparation method therefor and use thereof. The present disclosure takes hyaluronic acid as a raw material to prepare a hyaluronic acid aqueous solution or organic solution, then the hyaluronic acid aqueous solution or organic solution and a chlorhexidine solution are subjected to a complexation reaction, an insoluble substance therein is removed, and then the resulting solution is dried to obtain the water-soluble chlorhexidine antimicrobial agent, namely hyaluronic acid chlorhexidine. The hyaluronic acid chlorhexidine has a good broad-spectrum antimicrobial performance, and excellent water solubility. The hyaluronic acid chlorhexidine combines advantages of hyaluronic acid and chlorhexidine, has good biocompatibility, no cytotoxicity, no skin irritation, and good moisture retention, can be prepared into an antimicrobial aqueous solution or gel, ointment and other products, and is used in the fields of medical devices, skin wound nursing, oral nursing, personal hygiene, environmental disinfection and the like.

6 Claims, 6 Drawing Sheets

PREPARATION METHOD AND APPLICATION OF WATER-SOLUBLE CHLORHEXIDINE HYALURONATE ANTIBACTERIAL AGENTS

TECHNICAL FIELD

The present disclosure relates to a water-soluble chlorhexidine antimicrobial agent and a preparation method therefor and use thereof, and belongs to the technical field of preparation and use of antimicrobial agents.

BACKGROUND

Pathogenic bacteria are extremely liable to cause various infectious diseases, threatening the health of human beings. In order to effectively control bacterial infections, various antibiotics, antimicrobial agents, disinfectants and antiseptics have been widely developed and used.

Chlorhexidine (1,6-bis(p-chlorophenyldiguanido)hexane) is a cationic surfactant, has an obvious affinity to bacteria, can destroy bacterial cell membranes, and inhibits bacterial metabolic enzymes, thereby killing bacteria. The chlorhexidine has excellent broad-spectrum antimicrobial and sterilization properties. The chlorhexidine has a stronger killing effect than quaternary ammonium compounds on some microorganisms, such as gram-positive bacteria, has a better killing effect on *Pseudomonas aeruginosa*, fungi and other bacteria. Even in the presence of blood or serum, the chlorhexidine is still effective, and has few local irritant reactions and allergic reactions. There are mainly three chlorhexidine (CHD) disinfectants at present, namely chlorhexidine acetate (AA-CHD), chlorhexidine gluconate (GA-CHD) and chlorhexidine alcohol.

Hyaluronic acid (HA) is a polymeric mucopolysaccharide formed by repeatedly linking N-acetylglucosamine and D-glucuronic acid as disaccharide units. The hyaluronic acid is widely distributed in the extracellular matrix of soft connective tissues of human bodies and animals, has important physiological functions of maintaining extracellular space, regulating osmotic pressure, lubricating and the like, is a natural macromolecular material with good biocompatibility, and is widely used in the fields of cosmetic medicine, health care, biological medicine and the like.

Although the chlorhexidine and a derivative thereof have a good antimicrobial performance, there are still obvious drawbacks: for example, the chlorhexidine acetate has poor water solubility and irritation, the chlorhexidine gluconate has poor stability and is easy to decompose under illumination, and a larger concentration of the chlorhexidine alcohol is needed to exert a better effect, thereby limiting the application range of a chlorhexidine antimicrobial agent. In addition, an alcohol substance is usually added into the chlorhexidine antimicrobial products. But the sequelae of frequent use of alcohol-containing antimicrobial and antivirus products are skin allergy, redness, roughness and other symptoms, and damage to the skin to a certain extent. Therefore, it is urgently needed to develop a novel water-soluble chlorhexidine antimicrobial product.

SUMMARY

In order to improve the water solubility of a chlorhexidine antimicrobial product, the present disclosure provides a water-soluble chlorhexidine derivative, namely hyaluronic acid chlorhexidine, which is prepared by a complexation reaction of hyaluronic acid and chlorhexidine. The preparation method is simple and efficient. The hyaluronic acid chlorhexidine can effectively overcome the defects and shortcomings of the existing chlorhexidine antimicrobial agent and performances thereof, has no cytotoxicity, no skin irritation, and good biocompatibility and stability, can be prepared into an antimicrobial aqueous solution or gel, ointment and other products, and is used in the fields of medical devices, skin wound nursing, oral nursing, personal hygiene, environmental disinfection and the like.

A first objective of the present disclosure is to provide a method for preparing a water-soluble chlorhexidine antimicrobial agent, comprising the following steps:

(1) while heating and stirring, dropwise adding a chlorhexidine solution into a hyaluronic acid solution to perform a complexation reaction therebetween, where a solvent used in the hyaluronic acid solution is any one of water, formamide, dimethyl sulfoxide (DMSO), and N,N-dimethylformamide (DMF); and a solvent used in the chlorhexidine solution is any one of formamide, DMSO, and DMF; and (2) taking the reaction solution obtained in step (1), separating a product, and then drying same to obtain a water-soluble chlorhexidine antimicrobial agent, namely hyaluronic acid chlorhexidine.

The hyaluronic acid chlorhexidine is composed of hyaluronic acid and chlorhexidine in a form of a salt, and a typical molecular structural formula thereof is shown as follows:

As one of the embodiments of the present disclosure, a solute hyaluronic acid in the hyaluronic acid solution is an oligose or an oligosaccharide, where the oligose is any one of disaccharide, tetrasaccharide, octasaccharide and decasaccharide, and a molecular weight of the oligosaccharide is 400 kDa-1,000 kDa.

As one of the embodiments of the present disclosure, the method includes the following steps:

dissolving 0.81 g of hyaluronic acid in 10 mL of DMF; dissolving 0.505 g of chlorhexidine in 2 mL of DMF; and dropwise adding the chlorhexidine solution into the hyaluronic acid solution, stirring same at room temperature for 12 h, and dialyzing (500 D) and freeze-drying same to obtain a hyaluronic acid chlorhexidine HA4-CHD, where a yield of the hyaluronic acid chlorhexidine is 88% and a specific type of the hyaluronic acid is hyaluronate tetrasaccharide.

As one of the embodiments of the present disclosure, the method includes the following steps:

dissolving 10.0 g of hyaluronic acid in 5 ml of DMSO; dissolving 6.1 g of chlorhexidine in 5 mL of DMSO; and dropwise adding the chlorhexidine solution into the hyaluronic acid solution, stirring same at 50° C. for 6 h, and dialyzing (1,000 D) and freeze-drying same to obtain a hyaluronic acid chlorhexidine HA8-CHD, where the yield of the hyaluronic acid chlorhexidine is 90% and the specific type of the hyaluronic acid is hyaluronate octasaccharide.

As one of the embodiments of the present disclosure, the method includes the following steps:

dissolving 30.0 g of hyaluronic acid in 15 mL of formamide; dissolving 18.7 g of chlorhexidine in 10 mL of formamide; and dropwise adding the chlorhexidine solution into the hyaluronic acid solution, stirring same at 75° C. for 3 h, settling same to obtain a crude product, dissolving same with deionized water, removing an insoluble substance by filtering, and freeze-drying the resulting solution to obtain a hyaluronic acid chlorhexidine HA10-CHD, where the yield of the hyaluronic acid chlorhexidine is 92% and the specific type of the hyaluronic acid is hyaluronate decasaccharide.

As one of the embodiments of the present disclosure, the method includes the following steps:

dissolving 100.0 g of hyaluronic acid in 50 ml of deionized water; dissolving 61.2 g of chlorhexidine in 30 ml of formamide; and dropwise adding the chlorhexidine solution into the hyaluronic acid solution, stirring same at 75° C. for 2 h, settling same with ethanol to obtain a crude product, dissolving same with the deionized water, removing an insoluble substance by filtering, and spray-drying same to obtain a hyaluronic acid chlorhexidine HAL-CHD, where the yield of the hyaluronic acid chlorhexidine is 85% and the specific type of the hyaluronic acid is 800 kDa hyaluronate oligosaccharide.

As one of the embodiments of the present disclosure, the method includes the following steps:

dissolving 0.8 g of hyaluronic acid in 10 mL of DMF; dissolving 0.505 g of chlorhexidine in 2 mL of DMF; and dropwise adding the chlorhexidine solution into the hyaluronic acid solution, stirring same at room temperature for 12 h, and dialyzing (500 D) and freeze-drying same to obtain a hyaluronic acid chlorhexidine HA2-CHD, where the yield of the hyaluronic acid chlorhexidine is 89.76% and the specific type of the hyaluronic acid is hyaluronate disaccharide.

As one of the embodiments of the present disclosure, the solute hyaluronic acid in the hyaluronic acid solution is prepared by removing a sodium ion from sodium hyaluronate via a pretreated cation exchange resin.

As one of the embodiments of the present disclosure, the cation exchange resin is any one of Amberlite 732, Amberlite IR120 and Dowex 50.

As one of the embodiments of the present disclosure, a pretreatment of the cation exchange resin is as follows:

S1: treating the cation exchange resin with deionized water to fully swell and wash same until a filtrate is clear and colorless;

S2: alternately soaking the cation exchange resin in a 4%-5% HCl solution and a 4%-5% NaOH solution respectively for 2-3 times with 2 h-4 h each time, and washing same to be neutral with the deionized water; and S3: soaking the cation exchange resin in the 4%-5% HCl solution and washing same to be neutral with the deionized water.

As one of the embodiments of the present disclosure, the drying is freeze-drying or spray-drying.

As one of the embodiments of the present disclosure, the product is separated by any one or more of settling, ultra-filtration and dialysis.

As one of the embodiments of the present disclosure, the heating and stirring in step (1) are performed at 25° C.-80° C., and the reaction while stirring is performed for 2 h-12 h.

A second objective of the present disclosure is to provide a water-soluble chlorhexidine antimicrobial agent prepared by the above-mentioned method.

A third objective of the present disclosure is to provide the above-mentioned water-soluble chlorhexidine antimicrobial agent as a sole active antimicrobial ingredient in a preparation of an antimicrobial aqueous solution, an antimicrobial gel and an antimicrobial ointment.

A fourth objective of the present disclosure is to provide a gram-negative antimicrobial agent using the above-mentioned water-soluble chlorhexidine antimicrobial agent as a sole active antimicrobial ingredient.

A fifth objective of the present disclosure is to provide a Staphylococcus aureus antimicrobial agent using the above-mentioned water-soluble chlorhexidine antimicrobial agent as a sole active antimicrobial ingredient.

Beneficial effects of the present disclosure:

(1) The present disclosure provides a water-soluble chlorhexidine antimicrobial agent, namely hyaluronic acid chlorhexidine. The water solubility and stability of an antimicrobial agent product are improved through the synergistic effect of hyaluronic acid and chlorhexidine. Besides, the hyaluronic acid chlorhexidine has no cytotoxicity, no skin irritation, and good moisture retention and biocompatibility.

(2) The hyaluronic acid chlorhexidine antimicrobial agent provided by the present disclosure has a good broad-spectrum antimicrobial performance and good water solubility, and overcomes the problem of solubility compared with the existing chlorhexidine acetate. The antimicrobial agent has good biocompatibility and an anti-inflammatory performance, and relieves a stimulation effect of the existing chlorhexidine antimicrobial agent on cells, which can be verified by a subsequent biotoxicity test.

(3) The water-soluble chlorhexidine antimicrobial agent of the present disclosure can be used for preparing products such as an antimicrobial aqueous solution, an antimicrobial gel and an antimicrobial ointment, and has wide application prospects in the fields of medical devices, skin wound nursing, oral nursing, personal hygiene, environmental disinfection and the like.

(4) The present disclosure utilizes an ionic electrostatic effect to compound the hyaluronic acid and the chlorhexidine, and chlorhexidine hyaluronic acid (hyalurate) is prepared through a complexation reaction. The method is simple and high in efficiency and yield.

(5) The water-soluble chlorhexidine antimicrobial agent of the present disclosure has a good broad-spectrum antimicrobial performance, especially on gram-negative bacteria such as *Escherichia coli*, gram-positive bacteria such as *S. aureus* and the like, showing excellent antibacterial performance. The minimum inhibitory concentrations are 0.0011 mmol/mL and 0.0008 mmol/mL respectively.

(6) The biocompatibility of the water-soluble chlorhexidine antimicrobial agent of the present disclosure is tested by a mouse fibroblast L-929. The result shows that the water-soluble chlorhexidine antimicrobial agent has no obvious cytotoxicity within 72 h and even has a promoting effect on cell proliferation compared with a control group.

(7) The water-soluble chlorhexidine antimicrobial agent of the present disclosure is prepared into a 0.1%-0.5% aqueous solution and an antimicrobial performance is tested. Compared with a commercially available chlorhexidine acetate antimicrobial agent and a chlorhexidine gluconate antimicrobial agent, the water-soluble chlorhexidine antimicrobial agent shows a more excellent performance: for example, the commonly commercially available chlorhexidine acetate antimicrobial agent is generally a 0.6%-1% alcohol solution and the chlorhexidine gluconate antimicrobial agent is generally a 0.5%-4% aqueous solution. Compared with the above-mentioned antimicrobial agents, the hyaluronic acid chlorhexidine antimicrobial agent of the present disclosure requires lower concentration and also has a higher sterilization rate.

DETAILED DESCRIPTION

In order to better understand the present disclosure, the content of the present disclosure is further illustrated in combination with the following examples and comparative examples, but the content of the present disclosure is not limited to the following examples, and the examples should not be construed as limiting the protective scope of the present disclosure.

Example 1: Preparation of Hyaluronic Acid Chlorhexidine (HA4-CHD)

Step S1: 20 g of an Amberlite 732 resin was soaked in deionized water (100 mL) for 12 h, and then washed with the deionized water until a filtrate was clear and colorless; secondly, the resin was soaked in a 4%-5% HCl aqueous solution (100 mL) for 2 h and washed to be neutral with the deionized water; and thirdly, the resin was soaked in a 4%-5% NaOH aqueous solution (100 mL) for 2 h, washed to be neutral with the deionized water, alternately soaked in the HCl aqueous solution and the NaOH aqueous solution 2 times, and finally, soaked in the 4%-5% HCl aqueous solution (100 mL) for 2 h and washed to be neutral with the deionized water for later use.

Step S2: the treated cation exchange resin Amberlite 732 (25 g) was filled into an ion exchange column and washed with the deionized water as a mobile phase until an eluate did not contain a chloride ion; and sodium hyaluronate (2 g, tetrasaccharide) was dissolved in 10 mL of the deionized water, the solution was added into the ion exchange column, and an eluate was collected and freeze-dried to obtain a white hyaluronic acid powder with a hyaluronic acid yield of 85%.

Step S3: the hyaluronic acid (0.81 g) obtained in the previous step was dissolved in DMF (10 mL); and chlorhexidine (0.505 g) was dissolved in the DMF (2 mL), the chlorhexidine solution was dropwise added into the hyaluronic acid solution and stirred at room temperature for 12 h, and the resulting solution was dialyzed (500 D) and freeze-dried to obtain hyaluronic acid chlorhexidine (HA4-CHD) with a yield of hyaluronic acid chlorhexidine of 88%.

Figure 1:
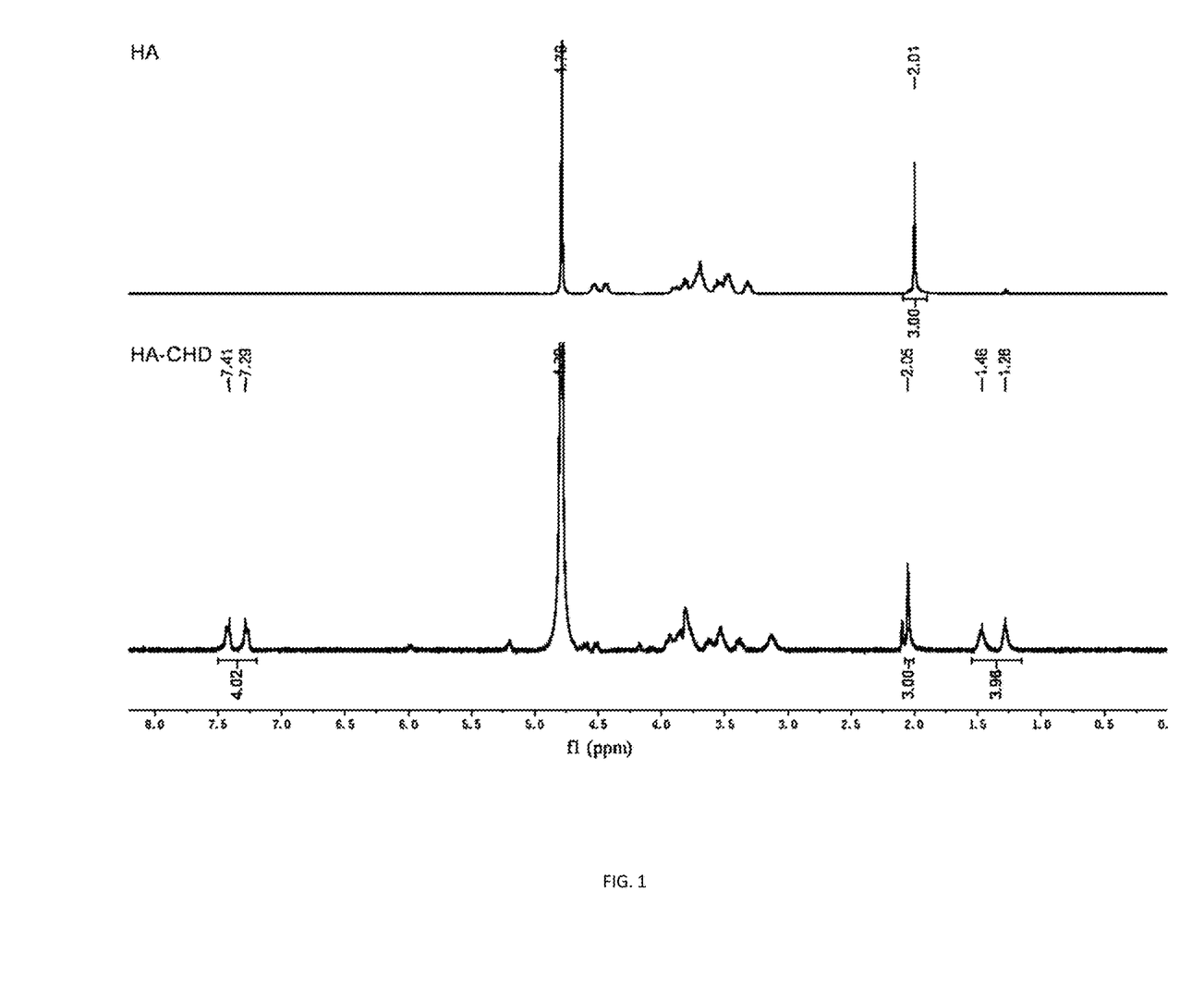
FIG. 1 shows 1H NMR spectrums of hyaluronic acid (HA4) and hyaluronic acid chlorhexidine (HA4-CHD) prepared in example 1.

The 1H NMR spectrums of the hyaluronic acid (HA) and hyaluronic acid chlorhexidine (HA-CHD) prepared by the present disclosure were shown in FIG. 1. The 1H NMR spectrums of the hyaluronic acid (HA4) and hyaluronic acid chlorhexidine (HA4-CHD) provided in example 1 were taken as an example. It can be seen from FIG. 1 that peaks of hydrogen atoms belonging to a glycosyl group of the hyaluronic acid at $\delta=2.0$ ppm and $\delta=3.0$ ppm-4.5 ppm in the 1H NMR spectrums of the hyaluronic acid chlorhexidine (HA4-CHD) were not changed, indicating that the hyaluronic acid was not destroyed in a complexation process. At the same time, two new peaks at $\delta=1.1$ ppm-1.5 ppm and $\delta=7.1$ ppm-7.5 ppm appeared and determined as hydrogen on two phenyl groups in the chlorhexidine by a peak area comparison, proving a successful complexation of the chlorhexidine with the hyaluronic acid at the ratio of 1:1. The successful synthesis of the hyaluronic acid (HA4) and the hyaluronic acid chlorhexidine (HA4-CHD) was confirmed. The 1H NMR spectrums of the hyaluronic acids (HA) with different glycosyl groups and the hyaluronic acid chlorhexidine (HA-CHD) salt were similar to the 1H NMR spectrums shown in FIG. 1.

Example 2: Preparation of Hyaluronic Acid Chlorhexidine (HA8-CHD)

Step S1: 100 g of an Amberlite IR120 resin was soaked in deionized water (400 mL) for 12 h, and then washed with the deionized water until a filtrate was clear and colorless;

secondly, the resin was soaked in a 4%-5% HCl aqueous solution (400 mL) for 3 h and washed to be neutral with the deionized water; and thirdly, the resin was soaked in a 4%-5% NaOH aqueous solution (400 mL) for 3 h, washed to be neutral with the deionized water, alternately soaked in the HCl aqueous solution and the NaOH aqueous solution 2 times, and finally, soaked in the 4%-5% HCl aqueous solution (400 mL) for 3 h and washed to be neutral with the deionized water for later use.

Step S2: the treated cation exchange resin Amberlite IR120 (80 g) was filled into an ion exchange column and washed with the deionized water as a mobile phase until an eluate did not contain a chloride ion; and sodium hyaluronate (20 g, octasaccharide) was dissolved in 20 ml of the deionized water, the solution was added into the ion exchange column, and an eluate was collected and freeze-dried to obtain a white hyaluronic acid powder with a hyaluronic acid yield of 80%.

Step S3: the hyaluronic acid (10.0 g) obtained in the previous step was dissolved in DMSO (5 mL); and chlorhexidine (6.1 g) was dissolved in the DMSO (5 mL), the chlorhexidine solution was dropwise added into the hyaluronic acid solution and stirred at 50° C. for 6 h, and the resulting solution was dialyzed (1,000 D) and freeze-dried to obtain hyaluronic acid chlorhexidine (HA8-CHD) with a yield of hyaluronic acid chlorhexidine of 90%.

Example 3: Preparation of Hyaluronic Acid Chlorhexidine (HA10-CHD)

Step S1: a cation exchange resin Amberlite 732 was firstly pretreated: an Amberlite 732 resin (300 g) was soaked in deionized water (800 mL) for 12 h, and then washed with the deionized water until a filtrate was clear and colorless; secondly, the resin was soaked in a 4%-5% HCl aqueous solution (800 mL) for 3 h and washed to be neutral with the deionized water; and thirdly, the resin was soaked in a 4%-5% NaOH aqueous solution (800 mL) for 3 h, washed to be neutral with the deionized water, alternately soaked in the HCl aqueous solution and the NaOH aqueous solution 2 times, and finally, soaked in the 4%-5% HCl aqueous solution (800 mL) for 3 h and washed to be neutral with the deionized water for later use.

Step S2: the treated cation exchange resin Amberlite 732 (250 g) was filled into an ion exchange column and washed with the deionized water as a mobile phase until an eluate did not contain a chloride ion; and sodium hyaluronate (40 g, decasaccharide) was dissolved in 30 mL of the deionized water, the solution was added into the ion exchange column, and an eluate was collected and freeze-dried to obtain a white hyaluronic acid powder with a hyaluronic acid yield of 88%.

Step S3: the hyaluronic acid (30.0 g) obtained in the previous step was dissolved in formamide (15 mL); and chlorhexidine (18.7 g) was dissolved in the formamide (10 mL), the chlorhexidine solution was dropwise added into the hyaluronic acid solution and stirred at 75° C. for 3 h, the resulting solution was settled to obtain a crude product, the crude product was dissolved with the deionized water, an insoluble substance was removed by filtering, and the resulting solution was freeze-dried to obtain hyaluronic acid chlorhexidine (HA10-CHD) with a yield of hyaluronic acid chlorhexidine of 92%.

Example 4: Preparation of Hyaluronic Acid Chlorhexidine (HAL-CHD)

Step S1: a cation exchange resin Dowex 50 was firstly pretreated: a Dowex 50 resin (1,000 g) was soaked in deionized water (800 mL) for 12 h, and then washed with the deionized water until a filtrate was clear and colorless; secondly, the resin was soaked in a 4%-5% HCl aqueous solution (1,500 mL) for 4 h and washed to be neutral with the deionized water; and thirdly, the resin was soaked in a 4%-5% NaOH aqueous solution (1,200 mL) for 4 h, washed to be neutral with the deionized water, alternately soaked in the HCl aqueous solution and the NaOH aqueous solution 3 times, and finally, soaked in the 4%-5% HCl aqueous solution (1,200 mL) for 4 h and washed to be neutral with the deionized water for later use.

Step S2: the treated cation exchange resin Dowex 50 (900 g) was filled into an ion exchange column and washed with the deionized water as a mobile phase until an eluate did not contain a chloride ion; and sodium hyaluronate (120 g, oligosaccharide 800 kDa) was dissolved in 100 ml of the deionized water, the solution was added into the ion exchange column, and an eluate was collected and spray-dried to obtain a white hyaluronic acid powder with a hyaluronic acid yield of 82%.

Step S3: the hyaluronic acid (100.0 g) obtained in the previous step was dissolved in the deionized water (50 mL); and chlorhexidine (61.2 g) was dissolved in formamide (30 mL), the chlorhexidine solution was dropwise added into the hyaluronic acid solution and stirred at 75° C. for 2 h, the resulting solution was settled with ethanol to obtain a crude product, the crude product was dissolved with the deionized water, an insoluble substance was removed by filtering, and the resulting solution was spray-dried to obtain hyaluronic acid chlorhexidine (HAL-CHD) with a yield of hyaluronic acid chlorhexidine of 85%.

Example 5: Preparation of Hyaluronic Acid Chlorhexidine (HA2-CHD)

Step S1: 100 g of an Amberlite IR120 resin was soaked in deionized water (400 mL) for 12 h, and then washed with the deionized water until a filtrate was clear and colorless; secondly, the resin was soaked in a 4%-5% HCl aqueous solution (400 mL) for 3 h and washed to be neutral with the deionized water; and thirdly, the resin was soaked in a 4%-5% NaOH aqueous solution (400 mL) for 3 h, washed to be neutral with the deionized water, alternately soaked in the HCl aqueous solution and the NaOH aqueous solution 2 times, and finally, soaked in the 4%-5% HCl aqueous solution (400 mL) for 3 h and washed to be neutral with the deionized water for later use.

Step S2: the treated cation exchange resin Amberlite IR120 (25 g) was filled into an ion exchange column and washed with the deionized water as a mobile phase until an eluate did not contain a chloride ion; and sodium hyaluronate (1 g, disaccharide) was dissolved in 10 ml of the deionized water, the solution was added into the ion exchange column, and an eluate was collected and freeze-dried to obtain a white hyaluronic acid powder with a hyaluronic acid yield of 98.87%.

Step S3: the hyaluronic acid (0.8 g) obtained in the previous step was dissolved in DMF (10 mL); and chlorhexidine (0.505 g) was dissolved in the DMF (2 mL), the chlorhexidine solution was dropwise added into the hyaluronic acid solution and stirred at room temperature for 12 h, and the resulting solution was dialyzed (500 D) and freeze-dried to obtain hyaluronic acid chlorhexidine (HA2-CHD) with a yield of hyaluronic acid chlorhexidine of 89.76%.

Example 6: Water Solubility Test

A method for testing the water solubility of the chlorhexidine antimicrobial disinfectant included the following steps:

1 ml of deionized water was added to 500 mg of a sample to be tested and the sample was fully dissolved at 25° C. If an insoluble component existed, an insoluble portion suspended in the solution. After the solution was centrifuged in a centrifuge (rate of 5,000 r/min) for 5 min, the residual solid was washed 3 times in acetone and then dried in a vacuum oven for 24 h, and after the solid was completely dried, the solid was weighed and recorded as $W_1$.

The solubility was calculated as follows:

solubility (mg/ml)=(500−$W_1$)/1 where $W_1$ is the mass (mg) of the undissolved solid.

The water solubility of the hyaluronic acid chlorhexidine, chlorhexidine (CHD), chlorhexidine acetate (AA-CHD), chlorhexidine gluconate (GA-CHD), and hyaluronic acid chlorhexidine of examples 1-4 was detailed in Table 1. It can be known from Table 1 that the hyaluronic acid chlorhexidine of the present disclosure had good water solubility (all 500 mg/ml or more). The water solubility of the hyaluronic acid chlorhexidine was better than that of the commercially available chlorhexidine acetate and the commercially available chlorhexidine gluconate, and thus an application prospect of the chlorhexidine antimicrobial agent was widened. Besides, the test result proved that on the basis of the method of the present disclosure, the molecular weight of the hyaluronic acid had no obvious influence on the water solubility of the hyaluronic acid chlorhexidine.

TABLE 1

Water solubility of chlorhexidine antimicrobial disinfectants

| Types of disinfectants | Water solubility (mg/mL) |
|---|---|
| CHD | 0.85 |
| AA-CHD | 19.05 |
| GA-CHD | ≥500 |
| HA2-CHD | ≥500 |
| HA4-CHD | ≥500 |
| HA8-CHD | ≥500 |
| HA10-CHD | ≥500 |
| HAL-CHD | ≥500 |

Example 7: In-vitro Antimicrobial Experiment

An in-vitro antimicrobial experiment of the chlorhexidine antimicrobial disinfectant was performed according to the following steps:

in a sterile super clean bench, the chlorhexidine antimicrobial disinfectants were separately prepared into 10 mg/ml solutions. A 96-well plate was taken and 100 μL of an LB liquid medium was injected into each well plate. Two rows in the same 96-well plate were respectively used as a sterile control and a drug-free control, 100 μL of the prepared chlorhexidine antimicrobial disinfectant solution was injected into the first column of the rest rows, two rows of each chlorhexidine antimicrobial disinfectant solution were injected as two groups of a parallel test, 100 μL of the uniformly mixed solution was injected into the right side well, the step was repeated until 12 columns of the wells were filled, and 100 μL of the solution was extracted from the last column and discarded. The previously cultured *E. coli* and *S. aureus* were diluted to a desired concentration of 1×10⁶ CFU/mL using the LB liquid medium. 100 μL of the above-mentioned bacterial solution was injected into each well of the rows injected with the chlorhexidine antimicrobial disinfectant and the drug-free control row in the same plate. Then the plate was placed into a biochemical incubator to be cultured at 37° C. for 24 h. The plate was taken out and the change of the turbidity degree of each well was observed. The clear wells indicated that no bacterial colony grew and the antimicrobial agent at the corresponding concentration had a killing effect on the bacteria. The turbid well indicated that the bacteria were not completely killed under the antimicrobial agent concentration and the bacteria still grew and reproduced. It was observed by naked eyes that the lowest concentration of the antimicrobial agent in the clear wells where no bacteria grew was the minimum inhibitory concentration (MIC) of the tested bacteria.

Figure 2A:
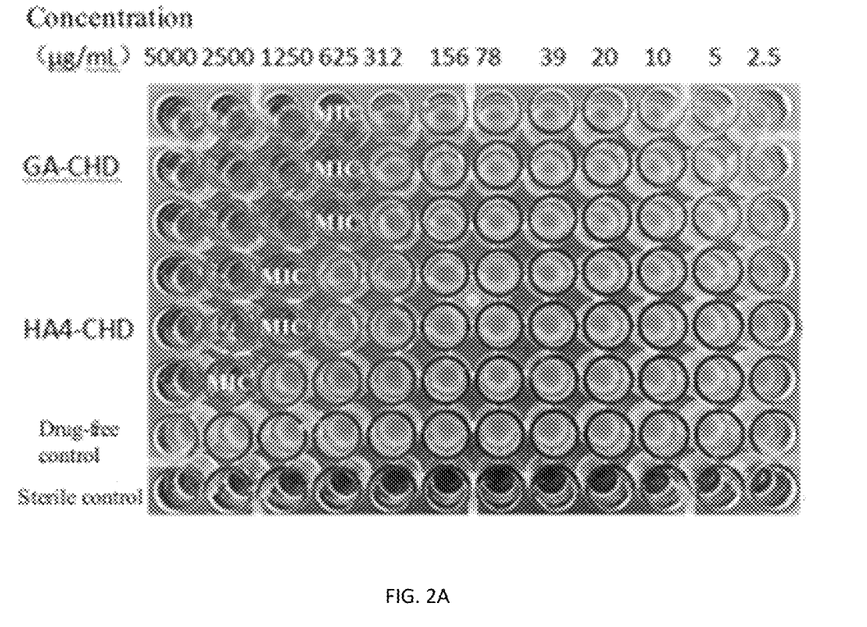
FIG. 2A shows antimicrobial effects of commercially available chlorhexidine gluconate (GA-CHD) and hyaluronic acid chlorhexidine (HA4-CHD) prepared in example 2 on *E. coli*.
Figure 2B:
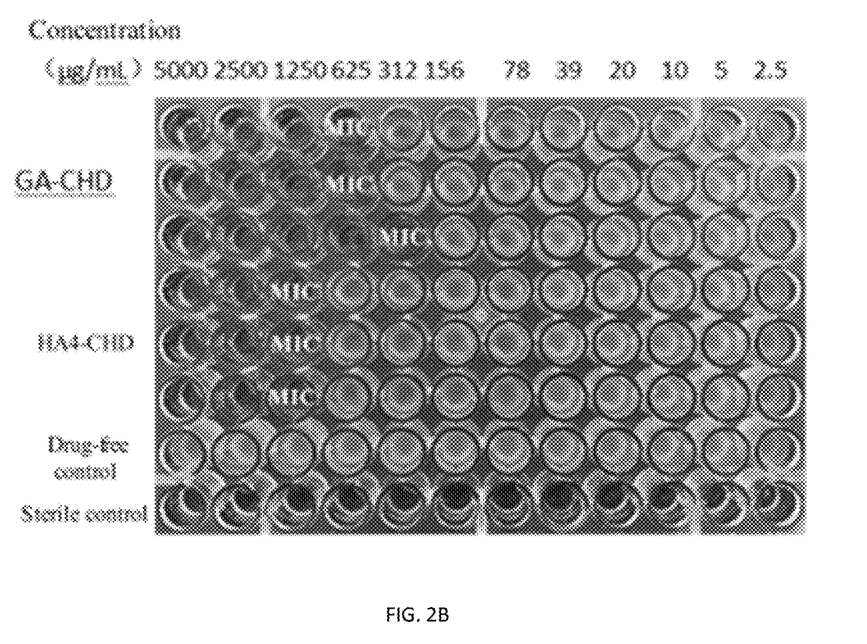
FIG. 2B shows antimicrobial effects of commercially available chlorhexidine gluconate (GA-CHD) and hyaluronic acid chlorhexidine (HA4-CHD) prepared in example 2 on *S. aureus.*

It can be seen from FIG. 2 that the MIC of the hyaluronic acid chlorhexidine (HA4-CHD) prepared in example 2 was 1.1 μmol/mL for the *E. coli* (corresponding to the mass concentration of 1,667 μg/mL) and the MIC was 0.8 μmol/ml for the *S. aureus* (corresponding to the mass concentration of 1,250 μg/mL); while the MIC of the commercially available chlorhexidine gluconate (GA-CHD) was 0.9 μmol/mL for the *E. coli* and the MIC was 0.7 μmol/mL for the *S. aureus*.

Example 8: Photostability Test

A photostability test of the hyaluronic acid chlorhexidine, for example the hyaluronic acid chlorhexidine (HA8-CHD) prepared in example 2, was performed according to the following steps:

a sample to be detected was exposed in an illumination box provided with a fluorescent lamp for 5 days and taken on 1st day, 3rd day and 5th day. Items (appearance, mass, 1H NMR spectrum detection, and antimicrobial performance) were mainly detected according to stability, especially the appearance change of the sample was particularly required to be noticed.

Figure 3A:
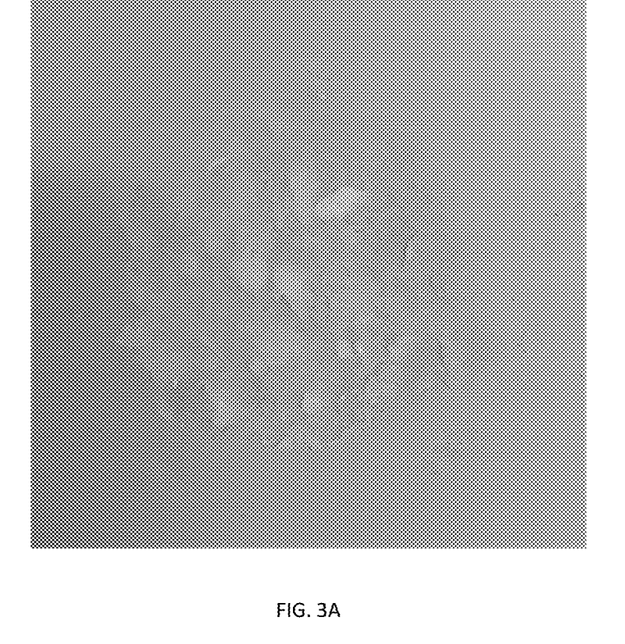
FIG. 3A shows a result of a photostability test of hyaluronic acid chlorhexidine (HA8-CHD) prepared in example 2 on 1st day.
Figure 3B:
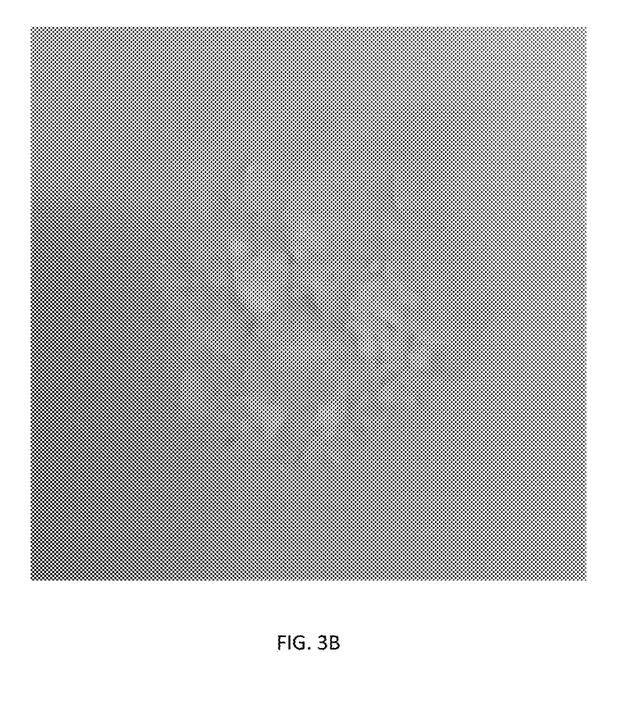
FIG. 3B shows a result of a photostability test of hyaluronic acid chlorhexidine (HA8-CHD) prepared in example 2 on 3rd day.
Figure 3C:
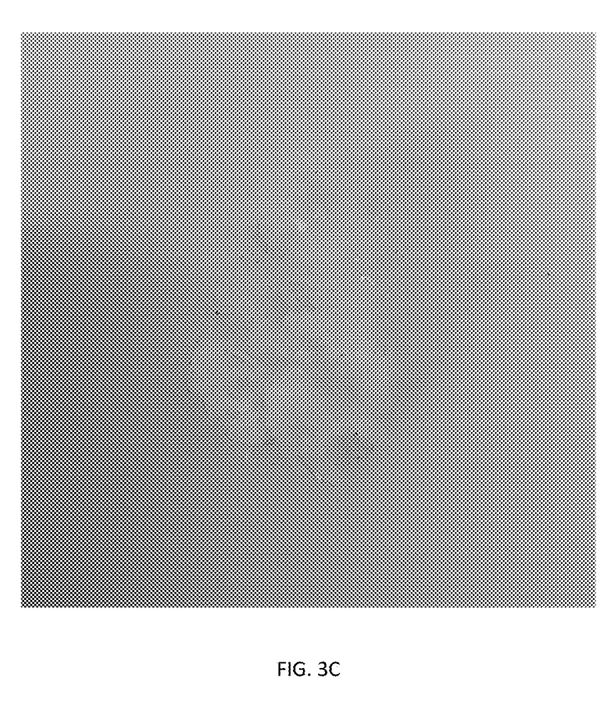
FIG. 3C shows a result of a photostability test of hyaluronic acid chlorhexidine (HA8-CHD) prepared in example 2 on 5th day.

It can be seen from FIG. 3A-3C that within 5 days of the illumination of the hyaluronic acid chlorhexidine (HA8-CHD) of the present disclosure, the sample had no significant difference in appearance from the freshly prepared sample.

Through the weighing analysis, it can be seen that within 5 days of the illumination of the hyaluronic acid chlorhexidine (HA8-CHD) of the present disclosure, the sample had no significant change in the mass of the freshly prepared sample.

Figure 4:
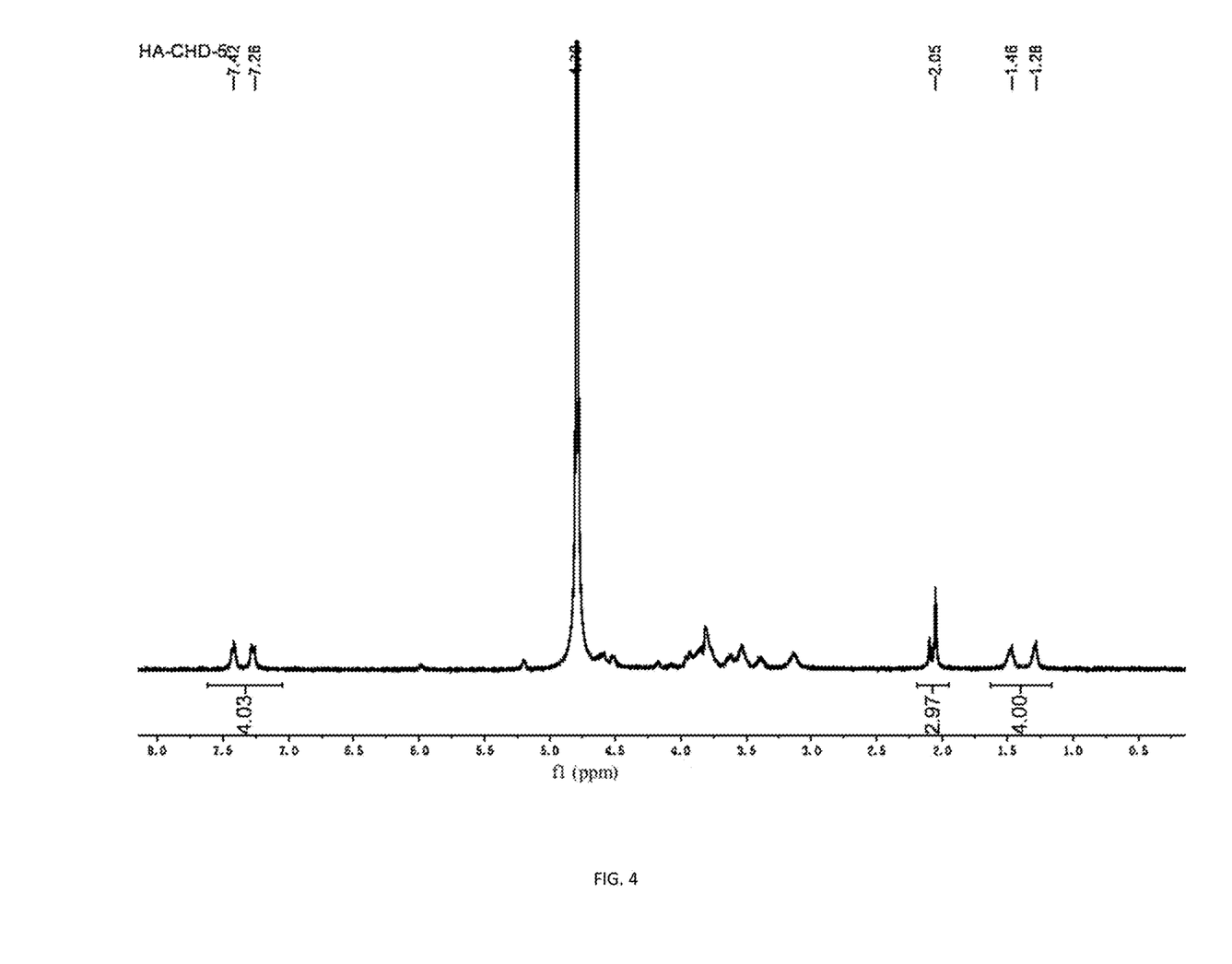
FIG. 4 shows a 1H NMR spectrum of a sample of hyaluronic acid chlorhexidine (HA8-CHD) of example 2 after 5 days of illumination.

Through the 1H NMR spectrum detection analysis, it can be seen that within 5 days of the illumination of the hyaluronic acid chlorhexidine (HA8-CHD) of the present disclosure, there was no significant difference in the structure characterization between the sample and the freshly prepared sample (see FIG. 4), and no new impurities were generated.

Through the antimicrobial performance test analysis, it can be seen that after the illumination of the hyaluronic acid chlorhexidine (HA8-CHD) of the present disclosure, the antimicrobial performance was not obviously reduced, indicating a better photostability.

Example 9: Cytotoxicity Test

A cytotoxicity test of the hyaluronic acid chlorhexidine, for example the hyaluronic acid chlorhexidine (HAL-CHD) of example 4, specifically included the following steps:

L-929 mouse fibroblasts were digested and the cell suspension concentration was adjusted to 0.5-1 million/ mL. 100 μL of the cell suspension was added into each well of a 96-well plate with 5,000 cells per well. The wells at the edge of the 96-well plate were filled with a culture solution. The cells were cultured overnight in a 5% $CO_2$ incubator at 37° C. Three samples of HAL-CHD-1 (1 MIC), HAL-CHD-3 (3 MIC) and HAL-CHD-5 (5 MIC) at the concentration gradients of 10 μL or less were respectively added, and 5 replicates were prepared for each concentration gradient. At the same time, a zero-setting well (containing a culture medium and CCK-8) was set. The 96-well plate was incubated in a 5% $CO_2$ incubator at 37° C. After 24 h, 48 h and 72 h, 10 μL of a CCK-8 reagent was added. The reaction was performed in the incubator for 3 h and the absorbance was measured using a microplate reader at the wavelength of 450 nm.

Figure 5:
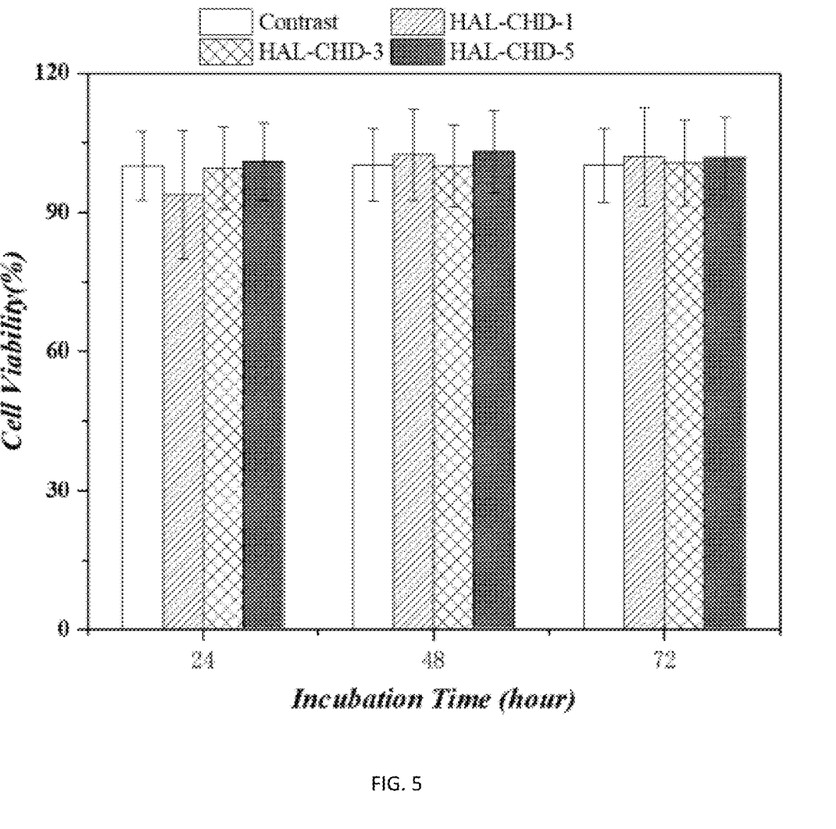
FIG. 5 shows a graph of a cytotoxicity test of hyaluronic acid chlorhexidine (HAL-CHD) prepared in example 4 against a mouse fibroblast cell L-929.

It can be seen from FIG. 5 that the cell viability of the cells treated with different concentrations of HAL-CHD was higher that of the control group, which indicated that the hyaluronic acid chlorhexidine of the present disclosure had good biocompatibility and can even promote cell proliferation to some extent.

Comparative Example 1

Referring to example 2, the only difference was that "the chlorhexidine solution was dropwise added into the hyaluronic acid solution" in step S3 was adjusted to "the hyaluronic acid solution was dropwise added into the chlorhexidine solution", and other conditions were not changed. The hyaluronic acid chlorhexidine (HA8-CHD) was obtained with a yield of hyaluronic acid chlorhexidine of only 10%.

Comparative Example 2

Referring to example 2, the only difference was that "chlorhexidine (6.1 g) was dissolved in the DMSO (5 mL) so as to obtain a chlorhexidine solution" in step S3 was adjusted to "chlorhexidine (6.1 g) was dissolved in ethanol (30 mL) so as to obtain a chlorhexidine solution", and other conditions were not changed. The hyaluronic acid chlorhexidine (HA8-CHD) was obtained with a yield of hyaluronic acid chlorhexidine of only 8%.

Comparative Example 3

Referring to example 2, the only difference was that "stirred at 50° C. for 6 h" in step S3 was adjusted to "stirred at 25° C. for 2 h", and other conditions were not changed. The hyaluronic acid chlorhexidine (HA8-CHD) was obtained with a yield of hyaluronic acid chlorhexidine of only 13%.

What is claimed is:

1. A method for preparing a water-soluble chlorhexidine antimicrobial agent, comprising:
   (a) adding while heating and stirring, a chlorhexidine solution dropwise into a hyaluronic acid solution to perform a complexation reaction therebetween thereby producing a reaction solution, wherein the hyaluronic acid solution comprises a first solvent selected from any one of water, formamide, DMSO, and DMF, and wherein the chlorhexidine solution comprises a second solvent selected from any one of formamide, DMSO, and DMF, and
   (b) separating a product from the reaction solution obtained in step (a), and drying the product to a solid form to obtain a water-soluble chlorhexidine antimicrobial agent, wherein the drying comprises freeze-drying or spray-drying, and wherein the agent is hyaluronic acid chlorhexidine.

2. The method according to claim 1, wherein the hyaluronic acid in the reaction solution is prepared by removing a sodium ion from sodium hyaluronate via a pretreated cation exchange resin.

3. The method according to claim 2, further comprising pretreating the cation exchange resin, which comprises:
   treating the cation exchange resin with deionized water to fully swell and wash the resin until a filtrate is clear and colorless,
   soaking the cation exchange resin alternately in a 4% to 5% HCl solution and then a 4% to 5% NaOH solution 2 to 3 times for 2 to 4 hours each time followed by washing the resin to be neutral with deionized water, and
   soaking the cation exchange resin in the 4% to 5% HCl solution and then washing the resin to be neutral with deionized water.

4. The method according to claim 1, further comprising, prior to the drying step, removing an insoluble substance by any one or more of settling, ultrafiltration, and dialysis.

5. The method according to claim 1, wherein the heating in step (a) is performed at 25° C. to 80° C., and wherein the stirring in step (a) is performed for 2 to 12 hours.

6. A water-soluble chlorhexidine antimicrobial agent, prepared by the method according to claim 1.

* * * * *